No. 795,580. PATENTED JULY 25, 1905.
S. A. COONEY.
CABLE GRIP.
APPLICATION FILED MAR. 28, 1905.
2 SHEETS—SHEET 2.
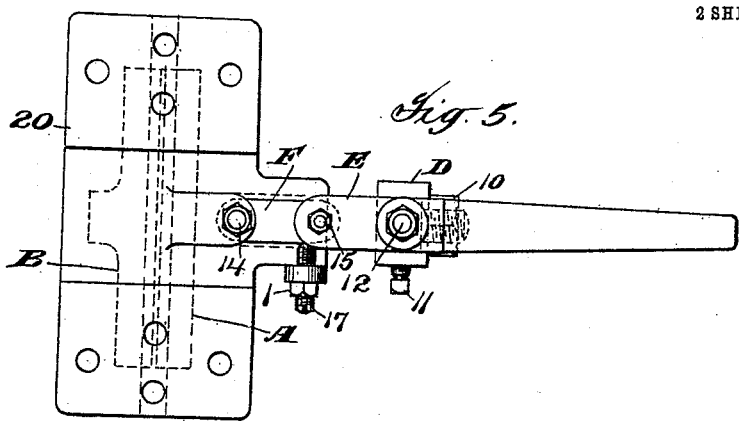
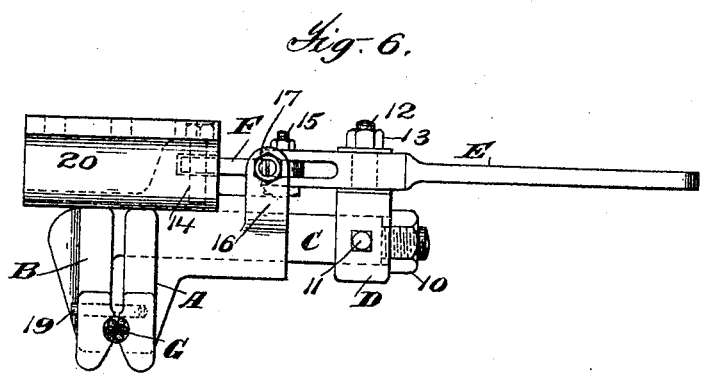
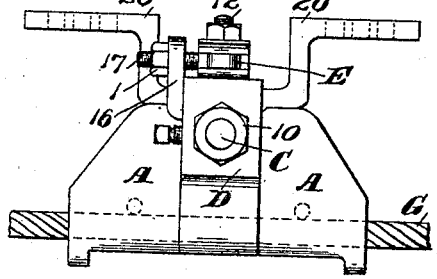
Witnesses
Inventor

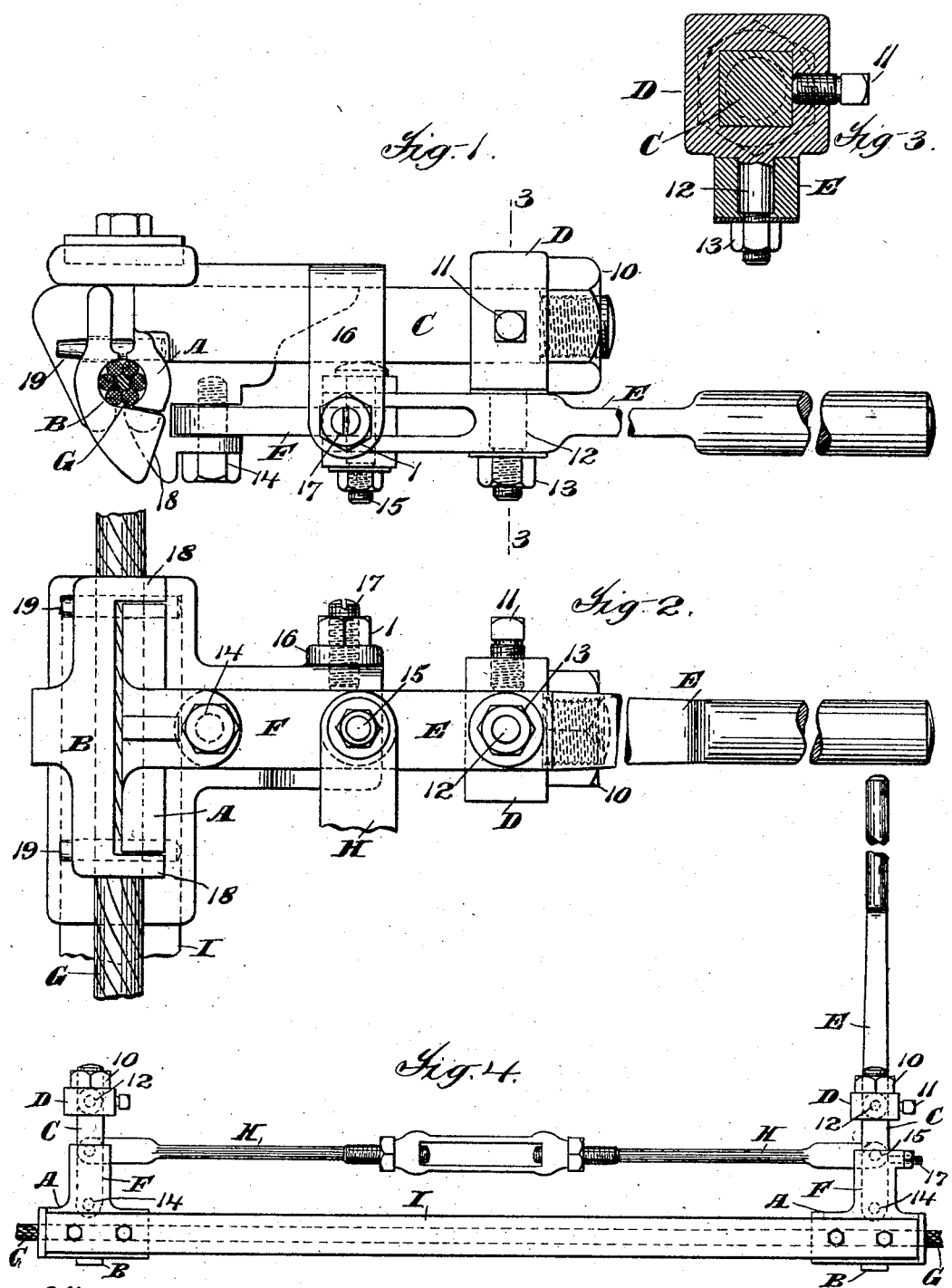

UNITED STATES PATENT OFFICE.

SEBERN ALLEN COONEY, OF NEW YORK, N. Y., ASSIGNOR OF ONE-HALF TO JOHN A. ROEBLING'S SONS COMPANY, OF TRENTON, NEW JERSEY, A CORPORATION OF NEW JERSEY.

CABLE-GRIP.

No. 795,580.     Specification of Letters Patent.     Patented July 25, 1905.

Application filed March 28, 1905. Serial No. 252,544.

*To all whom it may concern:*

Be it known that I, SEBERN ALLEN COONEY, a citizen of the United States, residing at New York city, county of New York, and State of New York, have invented certain new and useful Improvements in Cable-Grips, fully described and represented in the following specification and the accompanying drawings, forming a part of the same.

This invention relates to cable-grips, the especial object of the invention being to provide a simple, strong, and cheap construction with efficient gripping action and readily and efficiently adjustable for taking up wear between the parts.

As a full understanding of the invention can best be given by a detailed description of a grip embodying the invention, such a description will now be given in connection with the accompanying drawings, illustrating grips embodying all the features of the invention in preferred forms, and the features forming the invention then be pointed out in the claims.

In the drawings, Figure 1 is a view transverse to the cable, showing the grip in one of its preferred forms, which may be either a complete grip or, as illustrated in Figs. 1 to 3, one end of a double grip suitable for a tramway-bucket. Fig. 2 is a reverse plan view looking upward in Fig. 1. Fig. 3 is a cross-section on the line 3 of Fig. 1. Fig. 4 shows the complete double grip with two grips of the form shown in Figs. 1 to 3 connected for joint action. Fig. 5 is a plan view of a modified form of single grip for use on cars. Fig. 6 is a view transverse to the cable of the construction shown in Fig. 5. Fig. 7 is a view looking to the right in Fig. 6.

Referring now especially to Figs. 1 to 3, A is the fixed member or jaw, and B the movable member or jaw, of the grip. The movable jaw B carries a bar C, which passes through a block D, which block D is adjustable on bar C by a nut 10 on the screw-threaded end of the bar and held in adjusted position by set-screw 11. The block D carries a stud 12, on which is pivoted and held by nut 13 the lever E, which forms one member of a toggle, the other member being the link F, which is connected to the fixed jaw A of the grip by a pivot-bolt 14. The lever E is preferably forked to straddle the link F, as shown, and the two members of the toggle are connected together by pivot-bolt 15. The fixed jaw A carries an arm 16, in which is an adjustable screw-stop 17, having a lock-nut 1, which stop acts to stop the toggle when straightened in or just beyond the straight position of the toggle. The movable jaw B is preferably provided with the arms 18, as shown, which support the cable when the grip is partially opened and keep it in place, and pins 19 on the fixed jaw A and passing through holes in the movable jaw B above the cable are preferably used to prevent the cable rising too high in the grip in picking up the cable. It will be obvious that by operating the lever E by hand or automatically by its engagement with a trip the toggle may be straightened so as to grip the cable G by drawing the bar C and jaw B to the right in Fig. 1 or the toggle broken to release the cable by moving the bar C and jaw B to the left.

An important feature of this grip is, besides the strong, cheap, simple construction and direct application of grip-pressure, that the wear in all bearings can be entirely taken up by the adjusting-nut 10 acting on block D, tightening which shortens connection between the lever E and movable jaw B and takes up all wear.

The double grip, intended especially for tramway-buckets, is formed, as shown in Figs. 1 to 4, by connecting the toggles at their joints 15 by the adjustable link H, so that the toggle-lever E actuates both grips, the fixed members of the grips being connected by the plate or bar I.

The grip shown in Figs. 5 to 7 is modified for use especially on cars and is substantially the same except in respect to the form of the fixed and movable members, and corresponding parts are lettered similarly to those of Figs. 1 to 3. In the form shown in Figs. 5 to 7 the fixed member A is shown as provided with a double bracket 20, by which the grip can be attached to the car or other carrier with which the grip is to be used.

It will be understood that the invention is not to be limited to the exact form or construction of the parts shown, but that these may be modified while retaining the invention as defined by the claims.

What I claim is—

1. In a cable-grip, the combination with the fixed and movable jaws, of an operating-toggle connecting the jaws and having one of its members pivoted on the fixed jaw and the other member on the movable jaw, and means for adjusting the toggle to take up wear, substantially as described.

2. In a cable-grip, the combination with the fixed and movable jaws, of an operating-toggle connecting the jaws and having one of its members pivoted on the fixed jaw and the other member on the movable jaw, and means for adjusting the pivot-point on the movable jaw, substantially as described.

3. In a cable-grip, the combination with the fixed and movable jaws, of an operating-toggle connecting the jaws and having one of its members pivoted on the fixed jaw and the other member on a pivot-block adjustable on the movable jaw, and an adjusting-nut acting on said block, substantially as described.

4. In a cable-grip, the combination with the fixed and movable jaws, of an operating-toggle connecting the jaws and a single nut acting to adjust the toggle to take up wear in all the bearings, substantially as described.

5. The combination with the fixed and movable jaws, of bar C on the movable jaw, pivot-block D, toggle members E, and F pivoted to the block D and the fixed jaw respectively, and adjusting-nut 10, substantially as described.

6. The combination with the fixed and movable jaws, of bar C on the movable jaw, pivot-block D, toggle members E, and F pivoted to the block D and the fixed jaw respectively, adjusting-nut 10 and set-screw 11, substantially as described.

7. In a double cable-grip, the combination with pairs of fixed and movable jaws, of bars C on the movable jaws, pivot-blocks D adjustable on the bars, toggles E, F having their members pivoted to the blocks D and the fixed jaws, a rigid connection between the fixed jaws, and a link connecting the toggles at their joints, substantially as described.

8. The combination with the fixed and movable jaws, of bar C on the movable jaw, pivot-block D adjustable on the bar, toggle members E, F pivoted to the block D and the fixed jaw, and toggle-stop 17, substantially as described.

In testimony whereof I have hereunto set my hand in the presence of two subscribing witnesses.

SEBERN ALLEN COONEY.

Witnesses:
J. A. GRAVES,
C. J. SAWYER.